United States Patent
Rogers et al.

(10) Patent No.: US 7,877,091 B2
(45) Date of Patent: Jan. 25, 2011

(54) METHOD AND SYSTEM FOR EXECUTING A CONTAINER MANAGED APPLICATION ON A PROCESSING DEVICE

(75) Inventors: Jeffrey Christopher Rogers, Scarborough (CA); Laura Doktorova, Mississauga (CA); Kamen B. Vitanov, Mississauga (CA); Michael Shenfield, Richmond Hill (CA); Viera Bibr, Kilbride (CA)

(73) Assignee: Research In Motion Limited, Waterloo, ON (CA)

( * ) Notice: Subject to any disclaimer, the term of this patent is extended or adjusted under 35 U.S.C. 154(b) by 803 days.

(21) Appl. No.: 11/405,595

(22) Filed: Apr. 18, 2006

(65) Prior Publication Data

US 2006/0259606 A1 Nov. 16, 2006

Related U.S. Application Data

(60) Provisional application No. 60/672,091, filed on Apr. 18, 2005.

(51) Int. Cl.
*H04W 4/00* (2009.01)
(52) U.S. Cl. .................................... 455/432.3
(58) Field of Classification Search ............... 455/432.3
See application file for complete search history.

(56) References Cited

U.S. PATENT DOCUMENTS

| | | | |
|---|---|---|---|
| 6,161,148 A | 12/2000 | Pratt et al. | |
| 6,654,947 B1 | 11/2003 | North et al. | |
| 6,836,880 B1 | 12/2004 | Dorn et al. | |
| 6,961,330 B1 * | 11/2005 | Cattan et al. | 370/352 |
| 7,194,543 B2 * | 3/2007 | Robertson et al. | 709/226 |
| 2002/0004856 A1 | 1/2002 | Sudarshan et al. | |
| 2002/0147739 A1 * | 10/2002 | Clements et al. | 707/500 |
| 2005/0060722 A1 | 3/2005 | Rochette et al. | |
| 2005/0216502 A1 * | 9/2005 | Kaura et al. | 707/103 R |
| 2005/0235274 A1 * | 10/2005 | Mamou et al. | 717/136 |
| 2005/0262194 A1 * | 11/2005 | Mamou et al. | 709/203 |
| 2006/0010195 A1 * | 1/2006 | Mamou et al. | 709/203 |
| 2006/0248121 A1 * | 11/2006 | Cacenco et al. | 707/200 |
| 2006/0248506 A1 * | 11/2006 | Luo et al. | 717/104 |
| 2006/0259606 A1 * | 11/2006 | Rogers et al. | 709/223 |

FOREIGN PATENT DOCUMENTS

WO WO 00/62185 10/2000

OTHER PUBLICATIONS

Anonymous: "About the OSGi Service Platform". Internet Citation (online) Jul. 12, 2004, XP002472115 URL: http://xml.coverpages.org.OSGI-ServicePlatformOverview2004.pdf>[retrieved on Apr. 22, 2008].

* cited by examiner

*Primary Examiner*—Joseph H Feild
*Assistant Examiner*—Huy D Nguyen
(74) *Attorney, Agent, or Firm*—Ogilvy Renault LLP

(57) ABSTRACT

There is provided a system for executing a container-managed application in a processing device, the system comprising a shared service container providing at least one common service for the processing device, executed in at least one process and at least one container-managed application, each comprising an application executed in a given process and accessing at least one service of the application and the at least one common service using a single service discovery API.

9 Claims, 3 Drawing Sheets

METHOD AND SYSTEM FOR EXECUTING A CONTAINER MANAGED APPLICATION ON A PROCESSING DEVICE

CROSS-REFERENCE TO RELATED APPLICATIONS

This patent application claims priority of U.S. Patent No. 60/672,091 that was filed Apr. 18, 2005 and which is entitled "Method and system for executing a container-managed application on a processing device", the specification of which is hereby incorporated by reference.

TECHNICAL FIELD

This application relates to the field of computer programs. More precisely, this application pertains to a method and system for executing a container-managed application in a processing device.

BACKGROUND

Having a container-based execution framework is already known on wireless devices. A service container architecture such as OSGI provides the ability to manage software components. The containers are usually limited to executing all components in one process, displaying a single user interface and executing a single instance of an application.

It is also known that separate processes running on a computer may communicate between themselves.

It will be appreciated that a process may be regarded as the context in which an application is executed by the operating system.

Also it is known for a process to send messages to each other through inter-process message pipes or application program interface (API) calls.

Unfortunately, various issues may arise from inter-process communication in a container-based environment. In fact, it will be appreciated that in the case of container-managed applications, the decision is made by the container based on an application descriptor. The container that makes a decision about access to the component principally identifies the client, client's security roles and roles required to get access to the component or its method. It is therefore possible that the container maliciously accesses some resources.

BRIEF DESCRIPTION OF THE DRAWINGS

Further features and advantages of the present application will become apparent from the following detailed description, taken in combination with the appended drawings, in which.

It will be noted that throughout the appended drawings, like features are identified by like reference numerals.

DETAILED DESCRIPTION

According to one aspect, there is provided a system for executing a container-managed application in a processing device, the system comprising a shared service container providing at least one common service for the processing device, executed in at least one process and at least one container-managed application, each comprising an application executed in a given process and accessing at least one service of the application and the at least one common service using a single service discovery API.

According to another aspect, there is provided a method for accessing a service on a processing device, the method comprising providing a shared service container comprising at least one common service to the processing device executed in at least one process and in a container-managed application comprising applications executed in a corresponding process, accessing a given service of one of the applications and the common service using a single service discovery API.

In this specification, the term "process" is intended to mean "a program in execution, which progresses in a sequential manner (i.e. a call stack)".

In this specification, the term "service container" is intended to mean "a process that can host software components".

Figure 1:
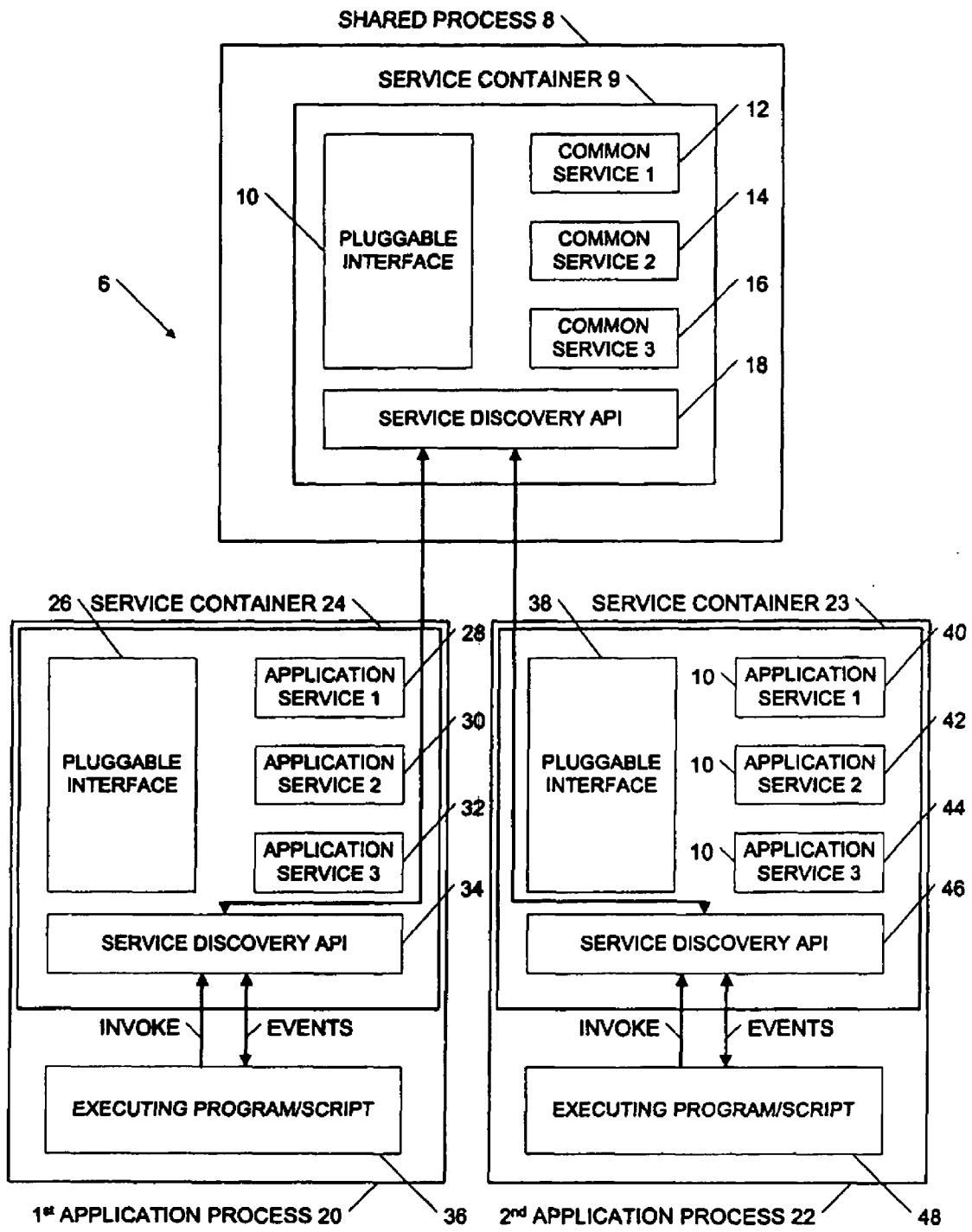
FIG. 1 is a block diagram of a system wherein a program/script of an application may access a service located in one of a service container of the application and a shared service container according to an embodiment.

Now referring to FIG. 1, there is shown one embodiment of a system 6 wherein a program/script of an application may access a service comprised in a service container. It will be appreciated that this may be used in any type of processing device such as for instance in a personal data assistant (PDA), a cell phone or the like.

More precisely, the system 6 comprises a shared process 8 which comprises a shared service container 9. The system 6 further comprises at least one application process each of which comprises a corresponding service container. In the embodiment disclosed in FIG. 1, the system 6 comprises a first application process 20 comprising service container 24 and a second application process 22 comprising service container 23.

The service container 9 of the shared process 8 provides services such as lifecycle management related services, communication-related services, security-related services, storage-related services, etc. to at least one application as explained further below.

In the embodiment disclosed in FIG. 1, the shared service container 9 comprises a first common service 12, a second common service 14 and a third common service 16.

The shared service container 9 of the shared process 8 further comprises a pluggable interface 10 and a service discovery application programming interface (API) 18.

The pluggable interface 10 is adapted for providing an interface between the service discovery API 18 and at least one common service.

The service discovery API 18 is used for accessing at least one of the common services as further explained below.

The first application process 20 comprises the service container 24.

The service container 24 comprises a pluggable interface 26, at least one application service and a service discovery API 34.

In the embodiment disclosed in FIG. 1, the service container 24 comprises a first application service 28, a second application service 30 and a third application service 32.

Each application service is used by a given application. It will be appreciated that the application service is dedicated to a single application.

The pluggable interface 26 is adapted for providing an interface between the service discovery API 34 and the at least one application service.

The service discovery API 34 is used for accessing at least one of the application services as further explained below.

An executing program/script 36 may access the service discovery API 34 using an invoke command.

The executing program/script 36 may also access the service discovery API 34 using an event signal.

Similarly, the second application process 22 comprises the service container 23.

The service container 23 comprises a pluggable interface 38, at least one application service and a service discovery API 46.

It will be appreciated that an application service comprises application-specific services that are only logical within the context of logic execution and/or script interpretation of a single program, such as a user interface.

In the embodiment disclosed in FIG. 1, the service container 23 comprises a first application service 40, a second application service 42 and a third application service 44.

Each application service is used by a given application. It will be appreciated that a given application service is dedicated to a predetermined application.

The pluggable interface 38 is adapted for providing an interface between the service discovery API 46 and the at least one application service.

The service discovery API 46 is used for accessing at least one application service as further explained below.

The executing program/script 48 accesses the service discovery API 46 using an invoke command.

The executing program/script 48 may also access the service discovery API 46 using an event signal.

Figure 2:
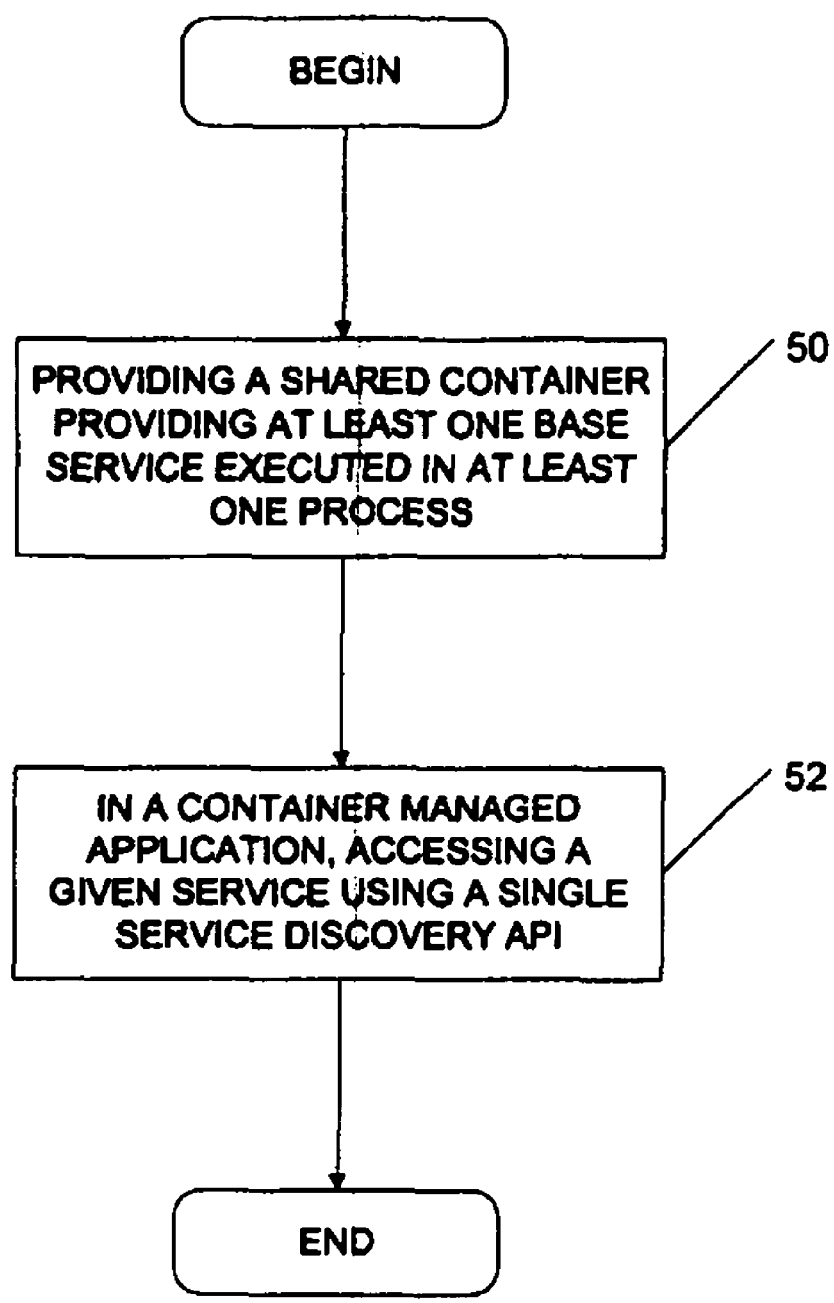
FIG. 2 is a flowchart showing how an application is executed according to an embodiment.

Now referring to FIG. 2, there is shown how a service is accessed when an application is executed according to an embodiment.

According to step 50, a shared service container providing at least one common service executed in at least one process is provided.

In one embodiment, the shared service container is provided.

It will be appreciated that the shared service container comprises at least a common service and a service discovery API.

It will be appreciated that the service discovery provided in the shared service container comprises an indication of the common services that are comprised in the shared service container.

Still referring to FIG. 2 and according to step 52, a given service is accessed using a single service discovery API in a container-managed application.

Figure 3:
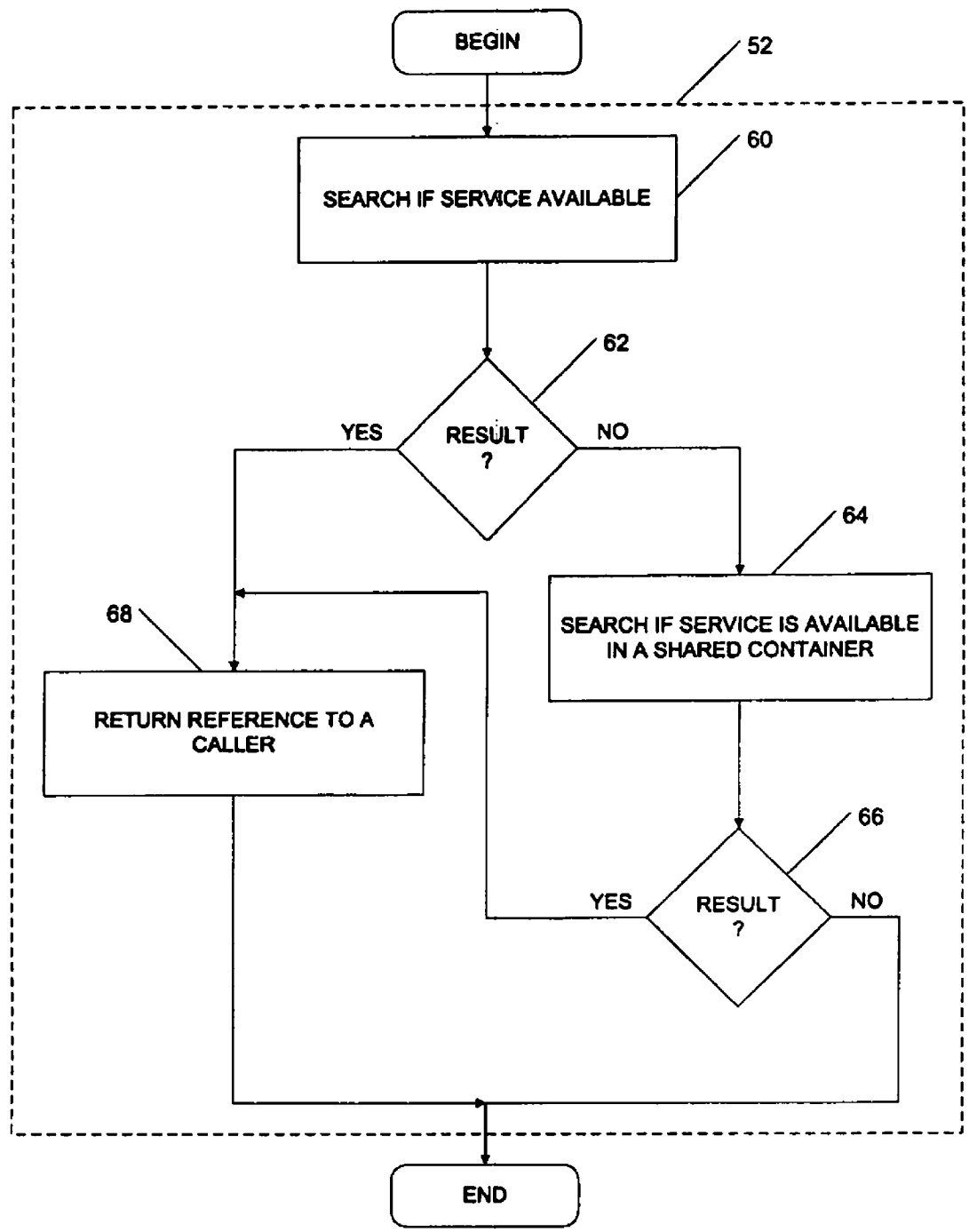
FIG. 3 is a flowchart showing how a given service is accessed according to an embodiment.

Now referring to FIG. 3, there is shown how a given service is accessed according to an embodiment.

According to step 60, a search is performed in order to find out if the given service is available locally. It will be appreciated that in fact a service may be available, inter alia, locally to an application or it may be available in the shared service container.

It will be appreciated that the search is initiated in response to one of an invoke command and an event signal performed by an executing program/script.

It will further be appreciated that the search is performed using the service discovery API. As explained above, the service discovery API is aware of the local services available.

According to step 62, a test is performed using the result of the search.

In the case where the given service is not available locally in the service container of the application, a search is performed to find out if the given service requested is available in the shared service container.

According to step 66, a test is performed in order to find out if the given service requested is available in the shared service container.

In the case where the given service requested is available in the shared service container, and in the case where the service requested is available locally and according to step 68, a reference is returned to a caller.

The skilled addressee will appreciate that having a service discovery API is of great advantage as it enables an application to have access to a service in a transparent manner, which is of great advantage for security purposes It will also be appreciated that the shared service container is executed in a first given process while other applications are executed using other processes.

It will also be appreciated that the shared service container may be executed in a single as well as in multiple processes.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present application can be carried out as a method, can be embodied in a system, a computer readable medium or an electrical or electro-magnetical signal.

The embodiments described above are intended to be exemplary only. The scope is therefore intended to be limited solely by the scope of the appended claims.

We claim:

1. A system for executing a container-managed application in a processing device having a processor, said system comprising: a non-transitory computer-readable medium having computer readable code including
    code for a shared service container providing at least one common service for said processing device, executable in at least one process on said processor;
    code for at least one container-managed application, each comprising an application executed in a given process and accessing at least one service of the application and said at least one common service using a single service discovery application program interface (API),
    wherein the shared service container comprises a process that hosts software components.

2. The system as claimed in claim 1, wherein said accessing comprises performing a search to find if said given service is available locally; if said given service is not available locally, performing a search to find out if the given service is available in the shared service container.

3. The system as claimed in claim 1, wherein said processing device may be selected from a group consisting of personal data assistants and cell phones.

4. A method for accessing a service on a processing device, said method comprising:
    providing a shared service container comprising at least one common service to said processing device executed in at least one process;
    in a container-managed application comprising applications executed in a corresponding process, accessing a given service of one of said applications and said common service using a single service discovery application program interface (API), wherein the shared service container comprises a process that hosts software components.

5. The method as claimed in claim 4, wherein said accessing comprises performing a search to find if said given service is available locally; if said given service is not available locally, performing a search to find out if the given service is available in the shared service container.

6. The method as claimed in claim 4, wherein said processing device may be selected from a group consisting of personal data assistants and cell phones.

7. A non-transitory computer-readable medium having computer readable code embodied thereon for execution by a processing device for accessing a service on the processing device, said method comprising:

providing a shared service container comprising at least one common service to said processing device executed in at least one process;

in a container-managed application comprising applications executed in a corresponding process, accessing a given service of one of said applications and said common service using a single service discovery application program interface (API), wherein the shared service container comprises a process that hosts software components.

8. The computer-readable medium of claim 7, wherein the step of accessing comprises performing a search to find if said given service is available locally; if said given service is not available locally, performing a search to find out if the given service is available in the shared service container.

9. The computer-readable medium of claim 7, wherein the processing device may be selected from a group consisting of personal data assistants and cell phones.

* * * * *